(12) United States Patent
Kawashima et al.

(10) Patent No.: US 11,107,305 B2
(45) Date of Patent: Aug. 31, 2021

(54) RIDE-HAILING VEHICLE IDENTIFICATION

(71) Applicant: HONDA MOTOR CO., LTD., Tokyo (JP)

(72) Inventors: Kiyotaka Kawashima, Los Angeles, CA (US); Ting Zhang, Torrance, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 320 days.

(21) Appl. No.: 16/353,543

(22) Filed: Mar. 14, 2019

(65) Prior Publication Data

US 2020/0294327 A1 Sep. 17, 2020

(51) Int. Cl.
| | |
|---|---|
| G07C 5/02 | (2006.01) |
| G01C 21/34 | (2006.01) |
| G08G 1/01 | (2006.01) |
| G01C 21/36 | (2006.01) |

(52) U.S. Cl.
CPC ............ G07C 5/02 (2013.01); G01C 21/3492 (2013.01); G01C 21/3679 (2013.01); G08G 1/0112 (2013.01); G08G 1/0129 (2013.01)

(58) Field of Classification Search
CPC .. G07C 5/02; G01C 21/3492; G01C 21/3679; G08G 1/0112; G08G 1/0129
See application file for complete search history.

(56) References Cited

U.S. PATENT DOCUMENTS

| | | | |
|---|---|---|---|
| 9,400,185 B2 | 7/2016 | Tanaka et al. | |
| 10,104,494 B2 | 10/2018 | Bellens et al. | |
| 2009/0012955 A1* | 1/2009 | Chu | G06Q 30/0261 |
| 2012/0130636 A1* | 5/2012 | Westerlage | G08G 1/20 |
| | | | 701/517 |
| 2013/0164715 A1 | 6/2013 | Hunt et al. | |
| 2014/0310027 A1* | 10/2014 | Gryan | G06Q 40/08 |
| | | | 705/4 |
| 2016/0034845 A1 | 2/2016 | Hiyama et al. | |
| 2016/0364812 A1 | 12/2016 | Cao | |
| 2018/0121847 A1 | 5/2018 | Zhao et al. | |
| 2018/0130095 A1 | 5/2018 | Khoury | |
| 2018/0286236 A1 | 10/2018 | Mazzola et al. | |
| 2020/0018976 A1* | 1/2020 | Van Wiemeersch | G06F 3/011 |
| 2020/0062274 A1 | 2/2020 | Kowal et al. | |
| 2020/0164891 A1 | 5/2020 | Bender et al. | |

FOREIGN PATENT DOCUMENTS

WO   WO 2018/134417 A1   7/2018

\* cited by examiner

*Primary Examiner* — Mahmoud S Ismail
*Assistant Examiner* — Gabriel Anfinrud
(74) *Attorney, Agent, or Firm* — Arent Fox LLP

(57) ABSTRACT

The present disclosure generally relates to methods and systems for determining usage of a vehicle. A vehicle monitoring system may include, a memory, at least one processor coupled to the memory, and a sensory system that generates vehicle trip data during a monitoring window. The vehicle monitoring system may partition the trip data into a base group and a contrast group. The vehicle monitoring system may calculate a similarity score between the contrast group and the base group. The vehicle monitoring system may determine that the vehicle has been used for commercial purposes in response to the similarity score satisfying a threshold.

18 Claims, 8 Drawing Sheets

RIDE-HAILING VEHICLE IDENTIFICATION

TECHNICAL FIELD

The present disclosure relates to monitoring vehicle usage, and more particularly to determining whether a vehicle is being used for commercial purposes.

BACKGROUND

Ride hailing applications may allow a passenger to arrange a ride from a driver operating a private vehicle. Typically, the passenger accesses a third party application via a mobile device to request the ride by specifying a pickup location and/or a destination. The driver also accesses a third party application via a mobile device to accept the request and navigate to the passenger and the destination. Additionally, the third party application may provide payment services for the passenger to pay the driver.

In some cases, a driver participating in a ride hailing application may not be the owner of the vehicle. For example, the vehicle may be leased or rented by the driver. In another example, the vehicle may be provided to the driver (e.g., by an employer) for a different purpose. The use of the vehicle for commercial purposes may violate an agreement between the driver and the owner of the vehicle. In other scenarios, the driver may have specified personal use of the vehicle when acquiring insurance.

In view of the foregoing, it may be advantageous to determine whether a vehicle is being used for commercial purposes. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the disclosure provides a first example method of determining usage of a vehicle. The method may include collecting vehicle trip data during a monitoring window. The method may include partitioning trips of the vehicle trip data into a base group and a contrast group. The method may include calculating a similarity score between the contrast group and the base group. The method may include determining that the vehicle has been used for commercial purposes in response to the similarity score satisfying a threshold.

In another aspect, the disclosure provides a second example method of determining usage of a vehicle. The method may include determining, by the vehicle, that the vehicle has visited a point of interest. The method may include comparing the point of interest to previously visited points of interest to determine whether the point of interest is a new point of interest. The method may include determining a rate of visiting new points of interest over a time window. The method may include determining that the vehicle is being used for commercial purposes in response to determining that the rate of visiting new points of interest during the time window exceeds a threshold.

In another aspect, the disclosure provides an apparatus for determining usage of a vehicle. The apparatus may include a memory and at least one processor coupled to the memory. The at least one processor may be configured to collect vehicle trip data during a monitoring window. The at least one processor may be configured to partition the vehicle trip data into a base group of trips and a contrast group of trips. The at least one processor may be configured to calculate a similarity score between the contrast group of trips and the base group of trips. The at least one processor may be configured to determine that the vehicle has been used for commercial purposes in response to the similarity score satisfying a threshold.

These and other aspects of the invention will become more fully understood upon a review of the detailed description, which follows.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
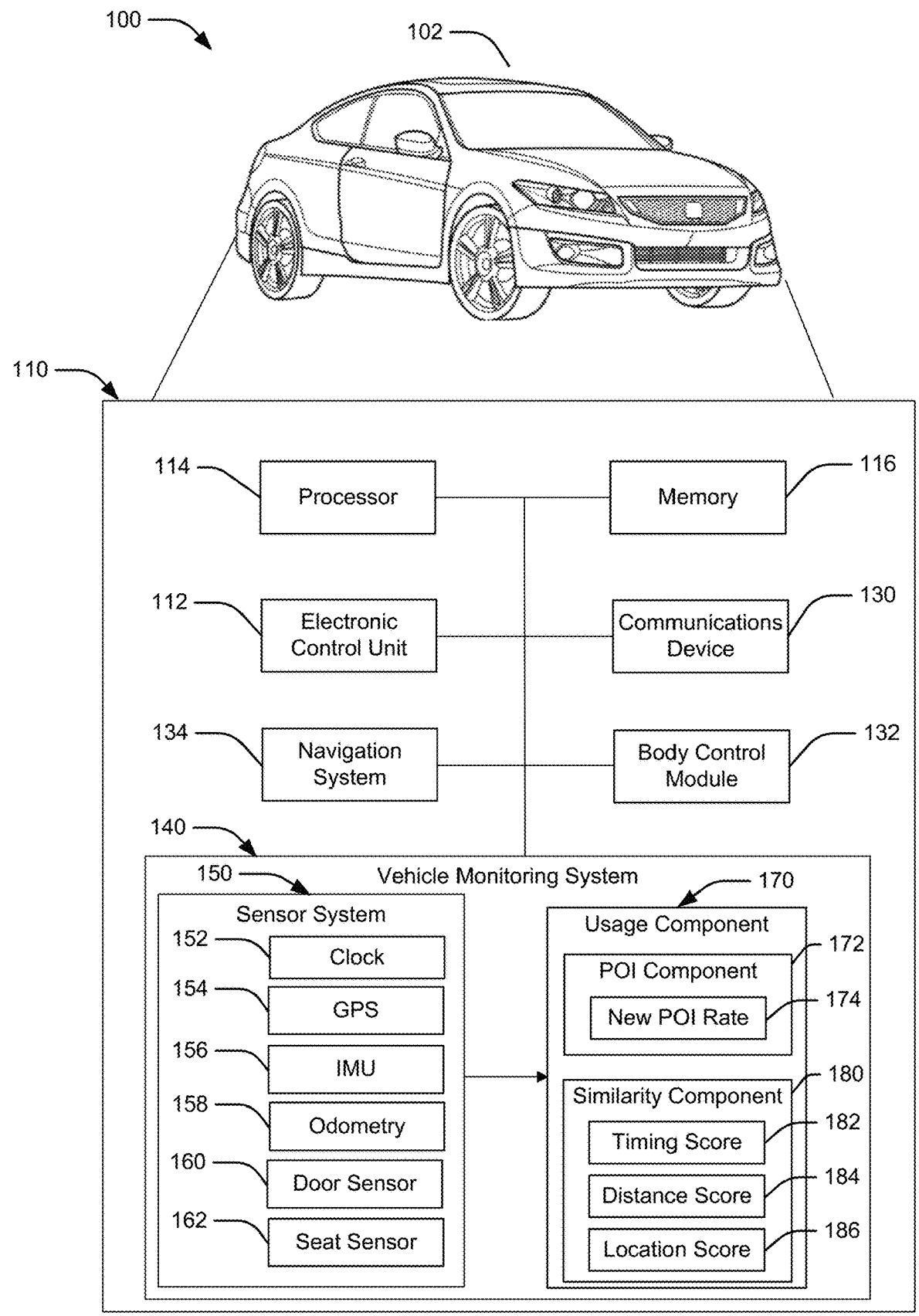
FIG. 1 illustrates a schematic view of an example operating environment of a vehicle monitoring system in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Various parties other than a driver may have an interest in knowing how a vehicle is being used. For example, a manufacturer, dealer, or finance company may want to know whether a driver is complying with terms of a lease. Similarly, a fleet operator or employer may want to know whether a vehicle is being used according to terms of an operating agreement. In another aspect, a manufacturer or certified maintenance services may provide different services or vehicle configurations or settings depending on the user of a vehicle. Relying on a driver to specify the use of the vehicle may be unreliable or burdensome.

According to the present disclosure, a vehicle may include a vehicle monitoring system that may determine how a vehicle is being used. In particular, the vehicle monitoring system may determine when the vehicle is being used for commercial purposes such as driving for a ride sharing service. The vehicle monitoring system may monitor vehicle position and vehicle events to determine characteristics of trips. The vehicle monitoring system may compare a base group of trips with a contrast group of trips to determine changes in driving patterns. In an aspect, the vehicle monitoring system may determine a similarity score between the base group of trips and the contrast group of trips, with a low level of similarity indicating that the vehicle is being used for commercial purposes.

Turning to FIG. 1, a schematic view of an example operating environment 100 of a vehicle 102 includes vehicle monitoring system 140. The vehicle monitoring system 140 may reside within a vehicle 102 along with other components of a vehicle control system 110. The components of the vehicle control system 110, as well as the components of other systems, hardware architectures, and software architectures discussed herein, may be combined, omitted or organized into various implementations.

The vehicle 102 may generally include an electronic control unit (ECU) 112, a processor 114, and memory 116. The ECU 112 operably controls a plurality of vehicle systems. The vehicle systems may include, but are not limited to, the vehicle control system 110 that includes the vehicle monitoring system 140, among others, including a sensor system 150, a body control module 132, a navigation system 134, vehicle HVAC systems, vehicle audio systems, vehicle video systems, vehicle infotainment systems, vehicle telephone systems, and the like. The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle control system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include a navigation system 134 for determining a route of the vehicle 102. In an aspect, the navigation system 134 may determine high-level options for the vehicle 102. For example, the navigation system 134 may determine that the vehicle 102 should make a left turn at an intersection based on the desired destination and current location. The navigation system 134 may employ conventional route planning algorithms to select a route that minimizes distance, travel time, or other factors.

The sensor system 150 may include multiple sensors that provide input to the vehicle control system 110. In particular, the sensor system 150 may include clock 152 that determines a time and date for various events of the vehicle 102. The sensor system 150 may include one or more of a global positioning system (GPS) 154 or other satellite-based navigation system, an inertial measurement unit (IMU) 156, an odometry sensor 158 (e.g., an odometer), one or more door sensors 160, and one or more seat sensors 162. The GPS 154 may use signals received from multiple satellites to calculate a location. The IMU 156 may detect acceleration and deceleration of the vehicle 102. The odometry sensor 158 may measure a distance traveled by the vehicle 102. The one or more door sensors 160 may detect when a door has been opened. The one or more seat sensors 162 may detect whether a seat is occupied. The one or more seat sensors 162 may determine a number of occupants in the vehicle 102. In an aspect, the door sensor 160 and/or the seat sensor 162 may be included in the body control module 132. The sensor system 150 may combine the output of multiple sensors to monitor events. For example, the sensor system may generate a trip including information regarding time from the clock 152, location and route from the GPS 154, and distance from the odometry sensor 158. In another example, a stop at a point of interest (POI) may be determined based on the GPS 154, the IMU 156, the door sensor 160, and the seat sensor 162.

The sensor system 150 may provide event data to a usage component 170 that may determine how the vehicle is being used. In an aspect, the usage component 170 may be implemented at the vehicle 102. For example, the usage component 170 may include software or firmware stored in the memory 116 and executed by the processor 114. The usage component 170 may provide information regarding the usage of the vehicle 102 to an external system such as a manufacturer telematics system via the communications device 130. In another aspect, the usage component 170 may be located remotely from the vehicle 102. For example, the usage component 170 may be implemented by a processor of the manufacturer telematics system. The sensor system 150 may transmit the event data to the usage component 170 at the manufacturer telematics system.

The usage component 170 may include a POI component 172 that determines vehicle usage based on visited points of interest. In particular, as explained in further detail below, the POI component 172 may determine a new POI rate 174 that indicates how often the vehicle 102 stops at a new POI. The POI component 172 may determine that the vehicle is being used for commercial purposes when the new POI rate 174 remains high for an extended period of time.

The usage component 170 may also include a similarity component 180 that determines a similarity score between trips of the vehicle 102. For example, the similarity component 180 may compare a base group of trips to a contrast group of trips to determine the similarity between the two groups. In an aspect, the base group of trips may be older trips (e.g., before a threshold date) and the contrast group of trips may be more recent trips (e.g., after the threshold date). Accordingly, the similarity score may indicate whether a driving pattern of the vehicle 102 has changed. In an aspect, the similarity score may include a timing score 182, a distance score 184, and a location score 186.

Figure 2:
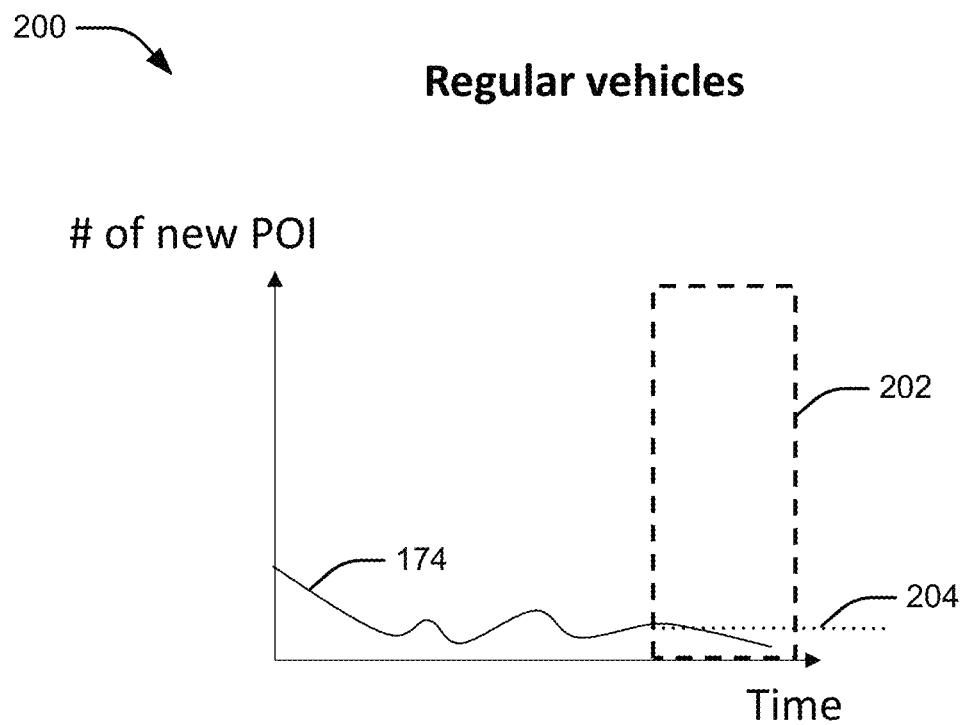
FIG. 2 illustrates charts showing changes in vehicle driving patterns over time, in accordance with aspects of the present disclosure.
Figure 2:
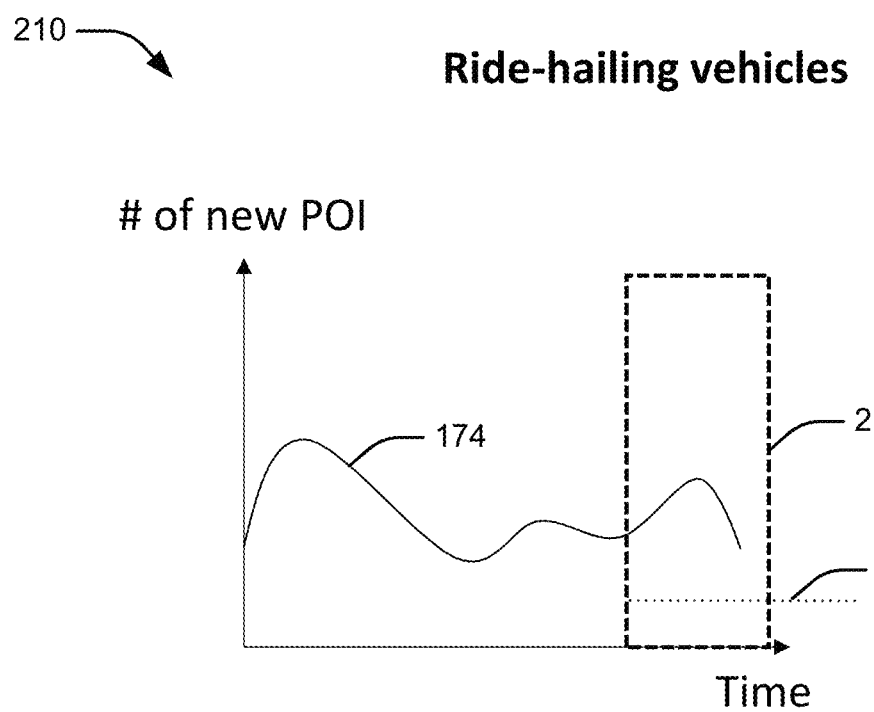

FIG. 2 illustrates charts 200, 210 showing changes in vehicle driving patterns over time. In particular, the charts 200, 210 show a number of new points of interest visited by the vehicle over time. Chart 200 shows an example driving pattern for a typical non-commercial use of a passenger vehicle starting at a time of purchase. The number of new POIs visited for non-commercial vehicle typically decreases over time. Generally, a non-commercial driver will quickly add new POIs as the vehicle is driven, but the number of new POIs will decline as the non-commercial driver settles into a typical driving pattern (e.g., trips between home, work, school, and local entertainment and shopping). The number of new POIs may increase occasionally, for example, when the driver takes a road trip, but such increases are typically limited duration.

In contrast, as seen in chart 210, the number of new POIs for a vehicle used for a ride hailing service typically is greater overall and remains high for an extended period of time. Because a ride hailing application directs the driver to pick-up and drop-off locations selected by different passengers, there is a greater variation of such POIs compared to destinations selected by a single driver. Accordingly, rather than visiting the same POIs, a driver using a ride hailing application will typically continue to visit new POIs for an extended period of time.

In an aspect, the POI component 172 may determine whether the vehicle 102 is being used for commercial purposes based on a rate of new POIs during a time window 202, 212. The time window 202, 212 may be at least a threshold amount of time after a purchase of the vehicle (e.g., at least 2 months). The threshold amount of time may allow a driver to establish typically visited locations as POIs. The time window 202, 212 may have a duration (e.g., 1 month). The duration may prevent events such as a vacation or road trip that increases the rate of new POIs for a short time from being interpreted as commercial use.

In an aspect, the POI component 172 may determine that the vehicle 102 is being used for commercial purposes when the rate of new POIs exceeds a threshold rate 204 for the duration of the time window 202, 212. For example, in chart 200, the rate of new POIs may be above the threshold rate 204 at the start of the window 202, but fall below the threshold rate 204 for the majority of the window 202. In contrast, in chart 210, the rate of new POIs may be consistently above the threshold rate 204. Accordingly, the POI component 172 may determine that the window 212 indicates that the vehicle 102 is being used for commercial purposes, whereas the window 202 does not indicate that the vehicle 102 is being used for commercial purposes. As discussed in further detail below, the POI component 172 may operate in conjunction with the similarity component 180 to refine the determination regarding the use of the vehicle 102.

Figure 3:
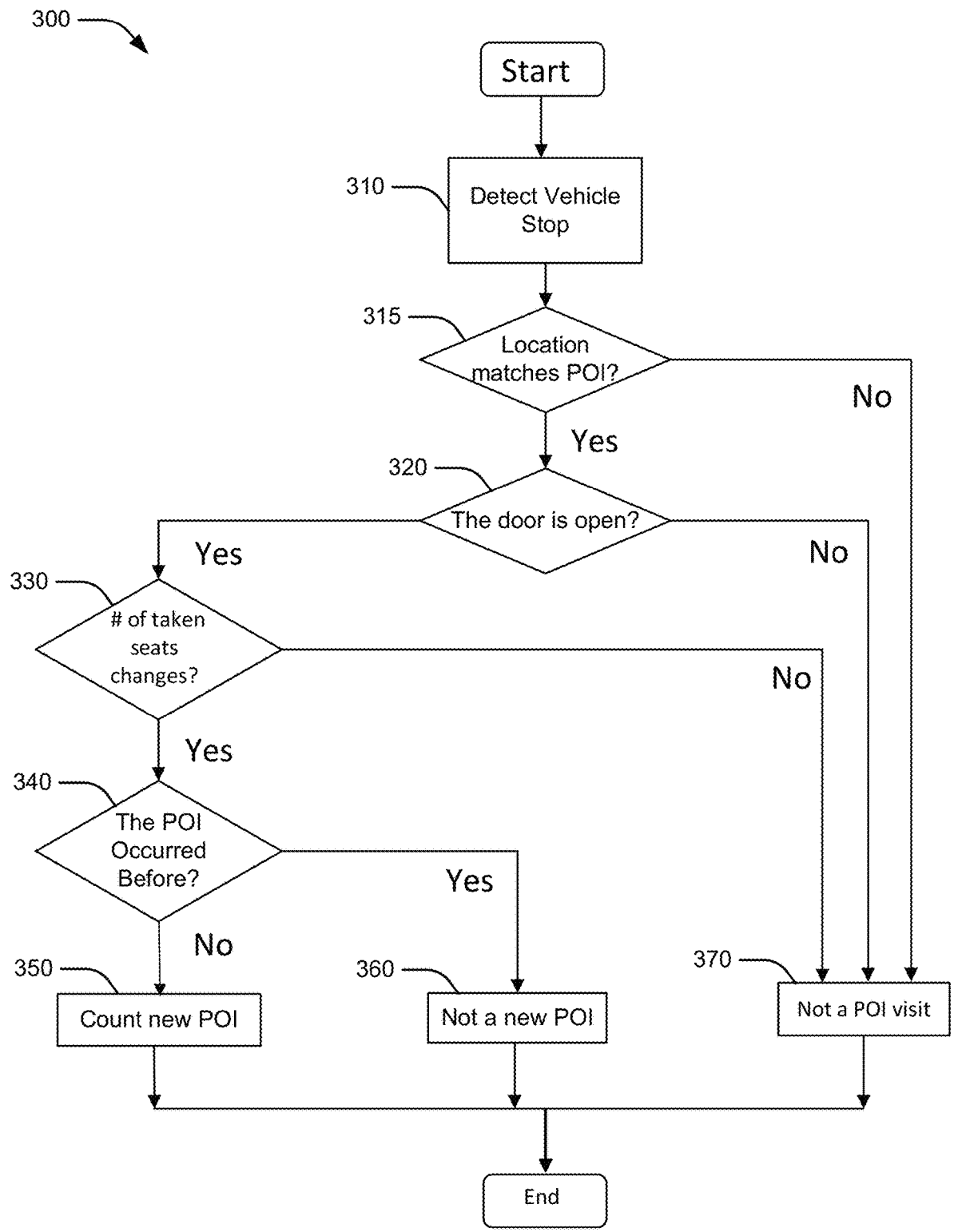
FIG. 3 is a flow diagram showing an example method for detecting new points of interest, in accordance with aspects of the present disclosure.

FIG. 3 is a flow diagram 300 showing an example method for detecting new points of interest visited by a vehicle 102. A point of interest (POI) may refer to a specific trip location. For example, categories of POIs may include residential areas, administrative and public services (e.g., schools and hospitals), commercial and business facilities, industrial areas, transportation services (e.g., railway or bus stations, or parking lots), and leisure locations. Although a vehicle may pass by or through many locations during a trip, the POI component 172 may determine new POIs when the vehicle 102 visits a POI. The POI component 172 may determine that the vehicle has visited a POI based on events occurring at the vehicle while the location of the vehicle matches a POI in a POI database. The POI database may associate a label (e.g, a POI name or category) with a range of GPS coordinates to define a known POI.

At block 310, the sensor system 150 may detect a vehicle stop. For example, the IMU 156 may detect that the vehicle 102 has stopped moving, or the GPS 154 or odometry sensor 158 may detect that the location of the vehicle has not changed for a period of time.

At block 315, the POI component 172 may determine whether a location of the vehicle 102 matches a POI. For example, the POI component 172 may look up the location in the POI database to determine whether the location is associate with a POI label. If there is no POI label associated with the location, the POI component 172 may determine at block 370 that the location is not a POI visit. For example, a stop on a highway due to traffic or an animal crossing may not be considered a POI visit.

If the location matches a POI, in block 320, the sensor system 150 may determine whether a vehicle door is opened at the location. For example, the sensor system 150 may report any door open events that occur after a stop at a POI is detected. If no door open event is detected at the stop location, the POI component 172 may determine at block 370 that the stop is not a POI visit. For example, a stop at a red light in front of a POI may not be considered a POI visit.

At block 330, the sensor system 150 may determine whether a number of occupied seats changes. For example, the seat sensor 162 may determine the number of occupied seats before and after the stop. The POI component 172 may determine whether the number of occupied seats has changed. If the number of occupied seats has not changed, at block 370, the POI component 172 may determine that the stop is not a POI visit. For example, a case where a family parks at a POI and the same number of seats is occupied when the family leaves the POI, may be excluded from the new POIs because such a stop may not indicate commercial activity.

At block 340, the POI component 172 may determine whether the POI visit has occurred before for the vehicle 102. For example, the POI component 172 may maintain a record of visited POIs. The POI component 172 may compare the POI corresponding to the location with the record of visited POIs. If the POI is not present in the record, at block 350, the POI component 172 may determine that the POI is a new POI. If the POI is present in the record, at block 360, the POI component may determine that the POI is not a new POI. The POI component 172 may determine the rate of new POIs based on the new POI.

Figure 4:
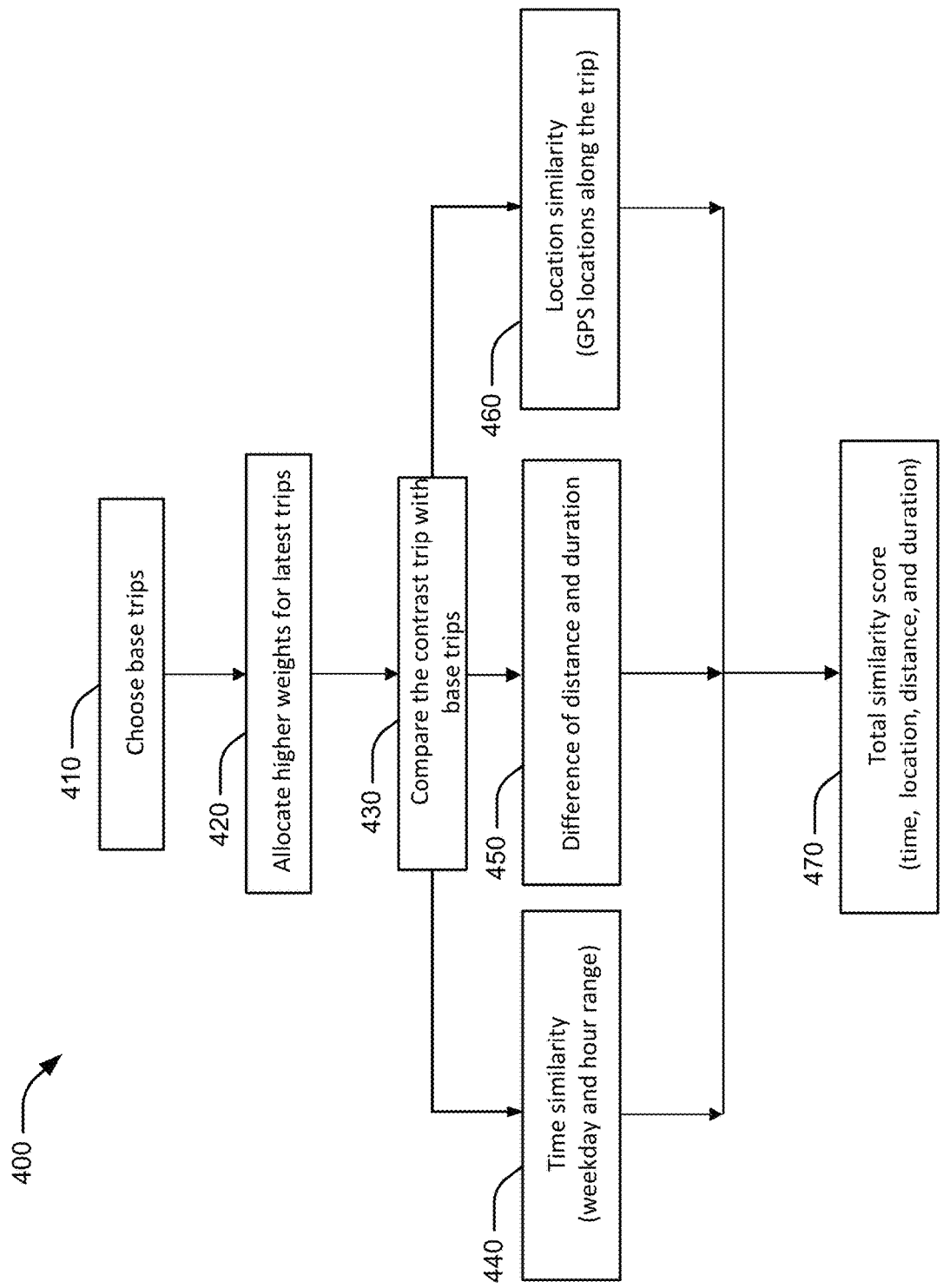
FIG. 4 is a flow diagram showing an example method for determining a similarity score, in accordance with aspects of the present disclosure.

FIG. 4 is a flow diagram showing an example method 400 for determining a similarity score. The method 400 may be performed by the similarity component 180 based on trip data generated by the sensor system 150.

In block 410, the similarity component 180 may choose a group of base trips. For example, the base trips may be trips selected based on date. The similarity component 180 may select trips that occurred before a threshold date as the base trips. The similarity component 180 may also select a contrast group of trips. The contrast group of trips may be trips that occurred after the threshold date. The threshold date may be based on the current date to create a sliding window for the group of base trips and/or the group of contrast trips.

In block 420, the similarity component 180 may allocate weights to the base trips. For example, the more recent trips within the group of base trips may have a higher weight applied. In one implementation, a decay factor based on the age of the trip may be used to allocate a greater weight to more recent trips.

In block 430, the similarity component 180 may compare the group of contrast trips with the group of base trips to generate one or more similarity scores. The comparison may be based on several factors including time and date, distance and duration, and location. For example, the similarity score for the distance can be based on a distance distribution table of base trips. The accumulative percentage which the distance of the contrast trip is in can be used as the similarity score for the distance. For instance, the similarity score for time can be based on a 24-hour distance distribution of base trips, in which each time period has a percentage of trips within this time period. The percentage of trips for the time period which the contrast trip is in can be used as a score. For example, at block 440, the similarity component 180 may compare the dates and times of the trips to determine a timing score 182. For instance, the similarity component 180 may determine a day of week and hour range for each trip. The similarity component 180 may detect patterns within the base group of trips. For example, the similarity component 180 may determine most common days and times for trips within the base group. The similarity component 180 may compare each trip within the contrast group to the base group. A match may occur when the weekday and time of the contrast trip overlaps with the weekday and time of the trip in the base group. For example, the similarity component 180 may compare a trip in the contrast group to the most common days and times. The similarity component 180 may assign a score to the contrast trip based on a match to the most common days and times, or assign a score to the contrast trip based on a number of matches to trips within the base group of trips. The score may also be based on a degree of overlap. For example, if the base group of trips includes a morning commute between 8 am and 9 am every Friday, a contrast trip from 8:10 am to 9:10 am on a Friday would have a higher score than a contrast trip from 7:30 am to 8:30 am on a Friday.

As another example, at block 450, the similarity component 180 may determine a difference in distance and duration between the contrast group of trips and the base group of trips to determine a distance score 184. For example, the similarity component 180 may determine a difference in one or more averages (e.g., mean, median, or mode) of one or both of distance and duration of the trips in each group. The similarity component 180 may determine a score based on the difference. For example, a small difference may result in a higher similarity score.

As another example, at block 460, the similarity component 180 may determine a location similarity to determine a location score 186. For example, the similarity component 180 may compare the GPS locations along each contrast trip with GPS locations along trips in the base group. For example, the similarity component 180 may determine whether the vehicle 102 followed the same route on the contrast trip as the route of any trip in the base group. A contrast trip that follows the same route may be assigned a high score, while a contrast trip that follows a different route (even for the same start and end locations) may be assigned a lower score.

At block 470 the similarity component 180 may determine a total similarity score. For example, the similarity component 180 may combine one or more of the timing score 182, the distance score 184, and the location score 186 to determine a total similarity score.

Figure 5:
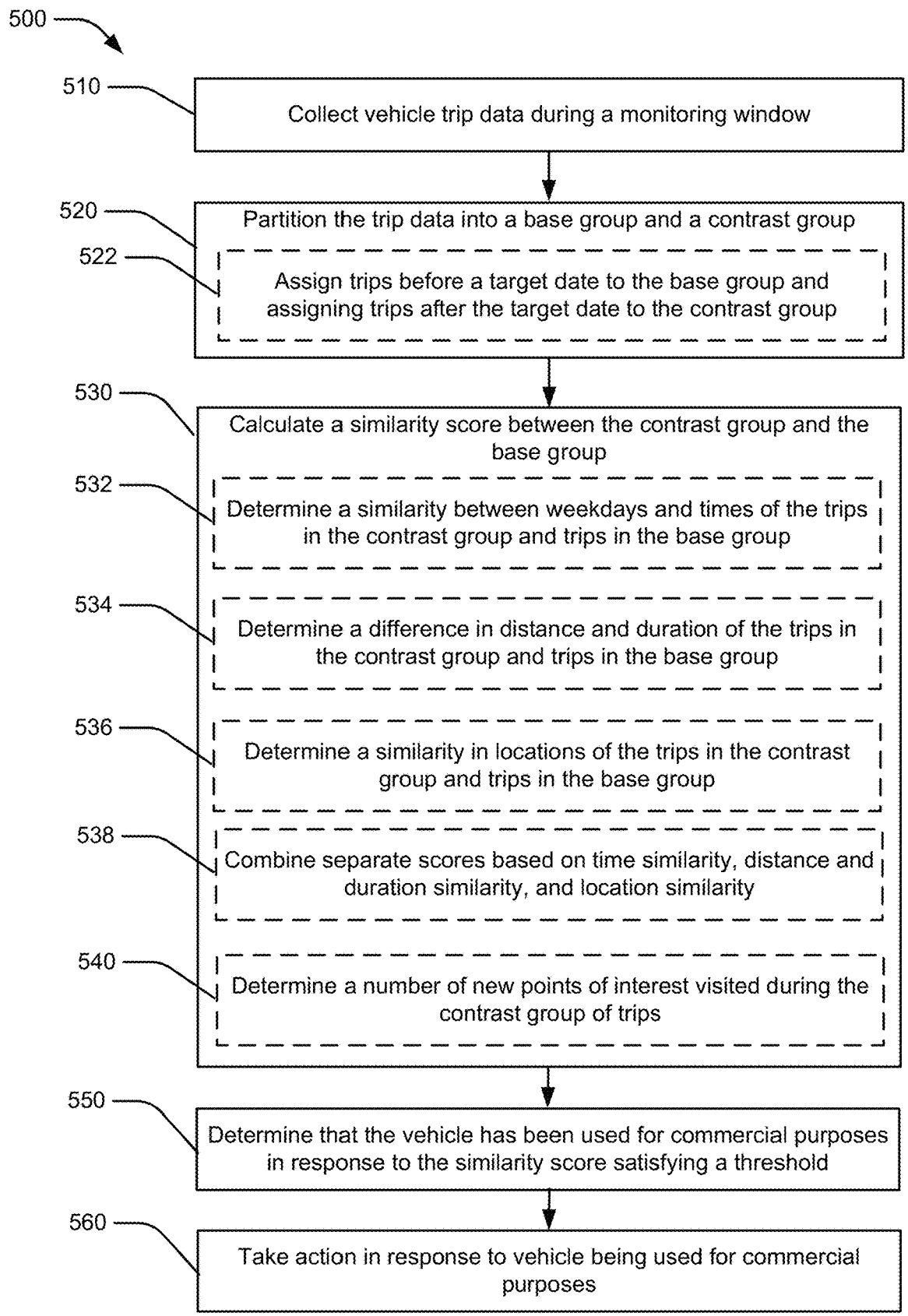
FIG. 5 illustrates a flowchart showing an example method of determining a use of a vehicle in accordance with aspects of the present disclosure.

FIG. 5 illustrates a flowchart showing an example method 500 of determining a use of a vehicle. The method 500 may be performed by the vehicle monitoring system 140 for a vehicle 102.

At block 510, the method 500 may include collecting vehicle trip data during a monitoring window. For example, the vehicle monitoring system 140 may control the sensor system 150 and the individual sensors thereof to collect vehicle trip data during a monitoring window (e.g., window 202, 212). The sensor system 150 may store the vehicle trip data in the memory 116 and/or transmit the vehicle trip data to an external system via the communications device 130.

At block 520, the method 500 may include partitioning the vehicle trip data into a base group of trips and a contrast group of trips. For example, the vehicle monitoring system 140 may execute the usage component 170 to partition the trip data into a base group of trips and a contrast group of trips. For instance, at sub-block 522, the usage component 170 may assign trips before a target date to the base group of trips and assigning trips after the target date to the contrast group of trips.

At block 530, the method 500 may include calculating a similarity score between the contrast group of trips and the base group of trips. For example, the vehicle monitoring system 140 may execute similarity component 180 to calculate a similarity score between the contrast group of trips and the base group of trips. For instance, the similarity component 180 may calculate the similarity score as described above regarding FIG. 4. In an aspect, for example, at sub-block 532, the block 530 may include determining a similarity between days and times of the trips in the contrast group and the trips in the base group. For example, the similarity component 180 may calculate the timing score 182. In another aspect, at sub-block 532, the block 530 may include determining a difference in distance and duration of the trips in the contrast group and the trips in the base group. For example, the similarity component 180 may calculate the distance score 184. In another aspect, at sub-block 534, the block 530 may include determining a similarity in locations of the trips in the contrast group and the trips in the base group. For example, the similarity component 180 may calculate the location score 186. In yet another aspect, at sub-block 538, the block 530 may include combining separate scores based on time similarity, distance and duration similarity, and location similarity. For example, the similarity component 180 may combine the timing score 182, the distance score 184, and the location score 186.

In another aspect, at sub-block 540, the block 530 may include determining a number of new points of interest visited during the contrast group of trips. For example, the vehicle monitoring system 140 may execute the POI component 172 to determine the number of new points of interest visited during the contrast group of trips. For example, as discussed above regarding FIG. 3, the POI component 172 may determine a visit to a new point of interest by determining that a vehicle door was opened at a location, determining that a number of occupied seats changed at the location, determining that the location is not present in the base group of trips, and adding the location as a new point of interest.

In block 550, the method 500 may include determining that the vehicle has been used for commercial purposes in response to the similarity score satisfying a threshold. In an aspect, for example, the similarity component 180 may determine that the vehicle 102 has been used for commercial purposes in response to the similarity score satisfying a threshold.

In block 560, the method 500 may include taking an action in response to the vehicle being used for commercial purposes. In an aspect, for example, the vehicle monitoring system 140 may take the action in response to the vehicle being used for commercial purposes. In one embodiment, for example, the vehicle monitoring system 140 may configure one or more performance characteristics of the vehicle 102 based on the vehicle being used for commercial purposes. For example, the vehicle monitoring system 140 may set or recommend a fuel efficient driving mode. As another example, the vehicle monitoring system 140 may recommend a better-fit vehicle type to the driver, based on the drivers' driving behavior. In another aspect, the vehicle monitoring system 140 may notify a driver or other party about the detected usage. For example, the vehicle monitoring system 140 may display a message on a dashboard, heads-up display, or infotainment system of the vehicle 102 indicating the detected usage. The message may also indicate whether the detected usage is in compliance with an agreement of the driver, or if any actions (e.g., acquiring specific insurance) need to be taken to comply with the agreement. As another example, the detected usage may be provided to a manufacturer to help develop more suitable interiors and human-machine interfaces (HMI) for specific commercial use cases.

Figure 6:
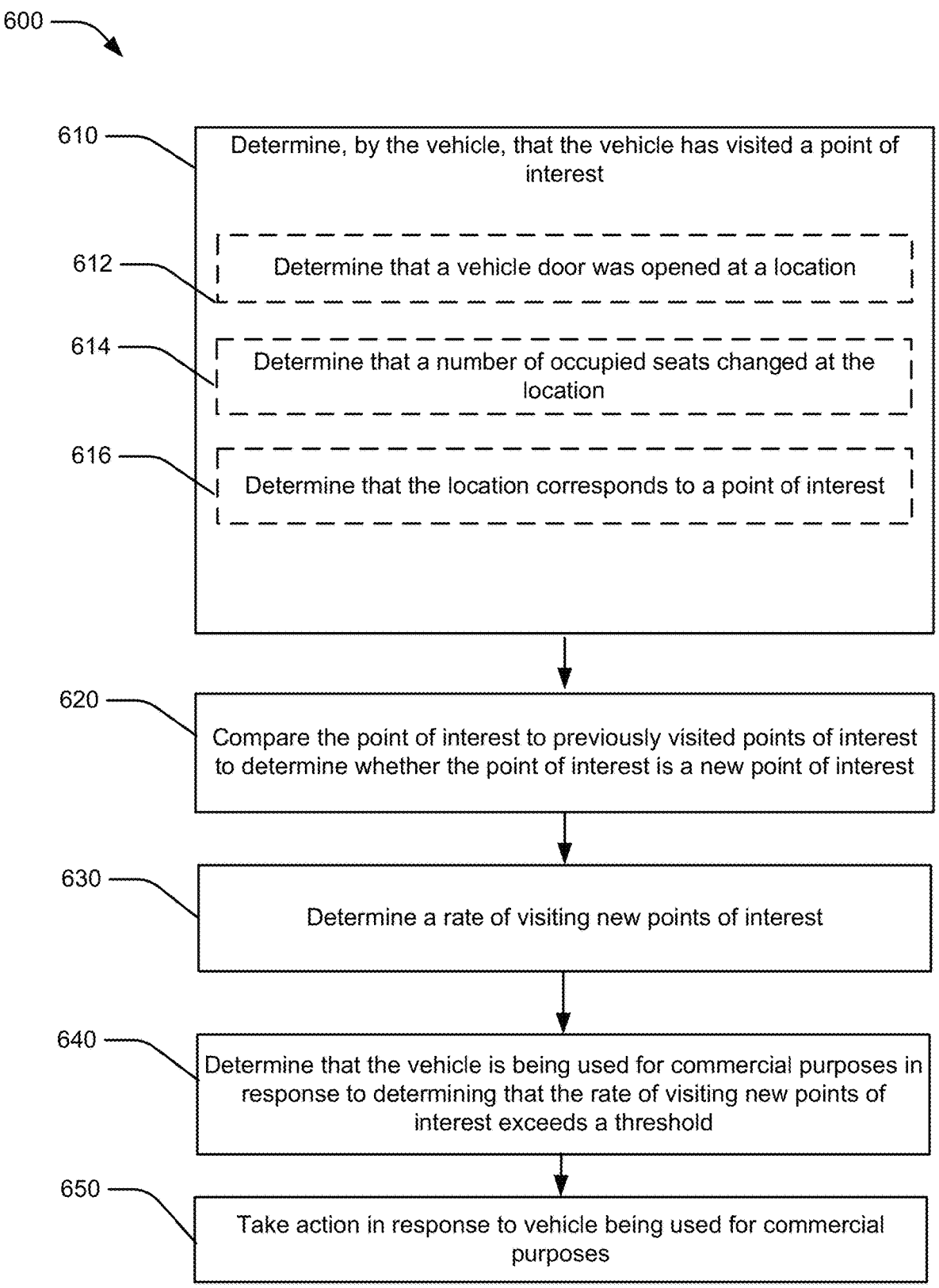
FIG. 6 illustrates a flowchart showing a second example method of determining a use of a vehicle in accordance with aspects of the present disclosure.

FIG. 6 illustrates a flowchart showing a second example method 600 of determining a use of a vehicle. The method 500 may be performed by the vehicle monitoring system 140 for a vehicle 102.

In block 610, the method 600 may include determining, by the vehicle, that the vehicle has visited a point of interest. In an aspect, for example, the vehicle monitoring system 140 of the vehicle 102, may determine that the vehicle 102 has visited a point of interest. For example, the vehicle monitoring system 140 may execute the POI component 172 to determine whether the vehicle 102 has visited a point of interest as described above regarding FIG. 3. For example, at sub-block 612, the POI component 172 may determine that a vehicle door was opened at a location. As another example, at sub-block 614, the POI component 172 may determine that a number of occupied seats changed at the location. As another example, at sub-block 616, the POI component 172 may determine that the location corresponds to a point of interest.

At block 620, the method 600 may include comparing the point of interest to previously visited points of interest to determine whether the point of interest is a new point of interest. For example, the vehicle monitoring system 140 may execute the POI component 172 to compare the point of interest to previously visited points of interest to determine whether the point of interest is a new point of interest.

At block 630, the method 600 may include determining a rate of visiting new points of interest. For example, the vehicle monitoring system 140 may execute the POI component 172 to determine the new POI rate 174. For example, the POI component 172 may divide the number of new points of interest detected during the time window 202, 212 by a number of units of time (e.g., days) in the monitoring window.

At block 640, the method 600 may include determining that the vehicle is being used for commercial purposes in response to determining that the rate of visiting new points of interest exceeds a threshold. In an aspect, for example, the vehicle monitoring system 140 may execute the POI component 172 to determine that the vehicle 102 is being used for commercial purposes in response to determining that the new POI rate 174 exceeds the threshold rate 204.

In block 650, the method 600 may include taking an action in response to the vehicle being used for commercial purposes. In an aspect, for example, the vehicle monitoring system 140 may take the action in response to the vehicle being used for commercial purposes. In one embodiment, for example, the vehicle monitoring system 140 may configure one or more performance characteristics of the vehicle 102 based on the vehicle being used for commercial purposes. For example, the vehicle monitoring system 140 may set or recommend a fuel efficient driving mode. In another aspect, the vehicle monitoring system 140 may notify a driver or other party about the detected usage. For example, the vehicle monitoring system 140 may display a message on a dashboard, heads-up display, or infotainment system of the vehicle 102 indicating the detected usage. The message may also indicate whether the detected usage is in compliance with an agreement of the driver, or if any actions (e.g., acquiring specific insurance) need to be taken to comply with the agreement.

Figure 7:
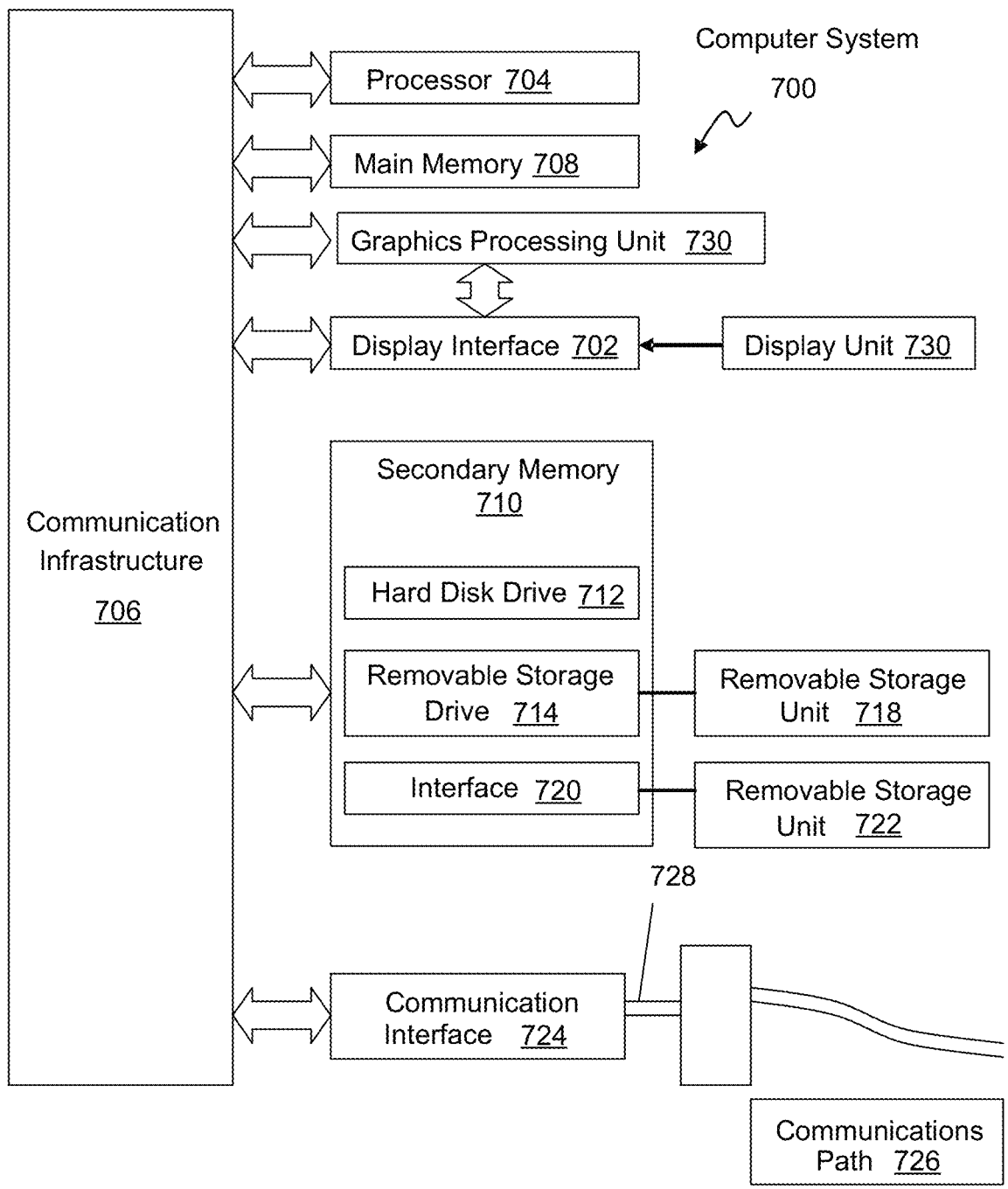
FIG. 7 presents an exemplary system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 7 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Aspects of the disclosure are directed to such computer program products.

Computer programs (also referred to as computer control logic) are stored in main memory 708 and/or secondary memory 710. Computer programs may also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software may be stored in a computer program product and loaded into computer system 700 using removable storage drive 714, hard disk drive 712, or communications interface 724. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s). In yet another example variation, aspects of the disclosure are implemented using a combination of both hardware and software.

Figure 8:
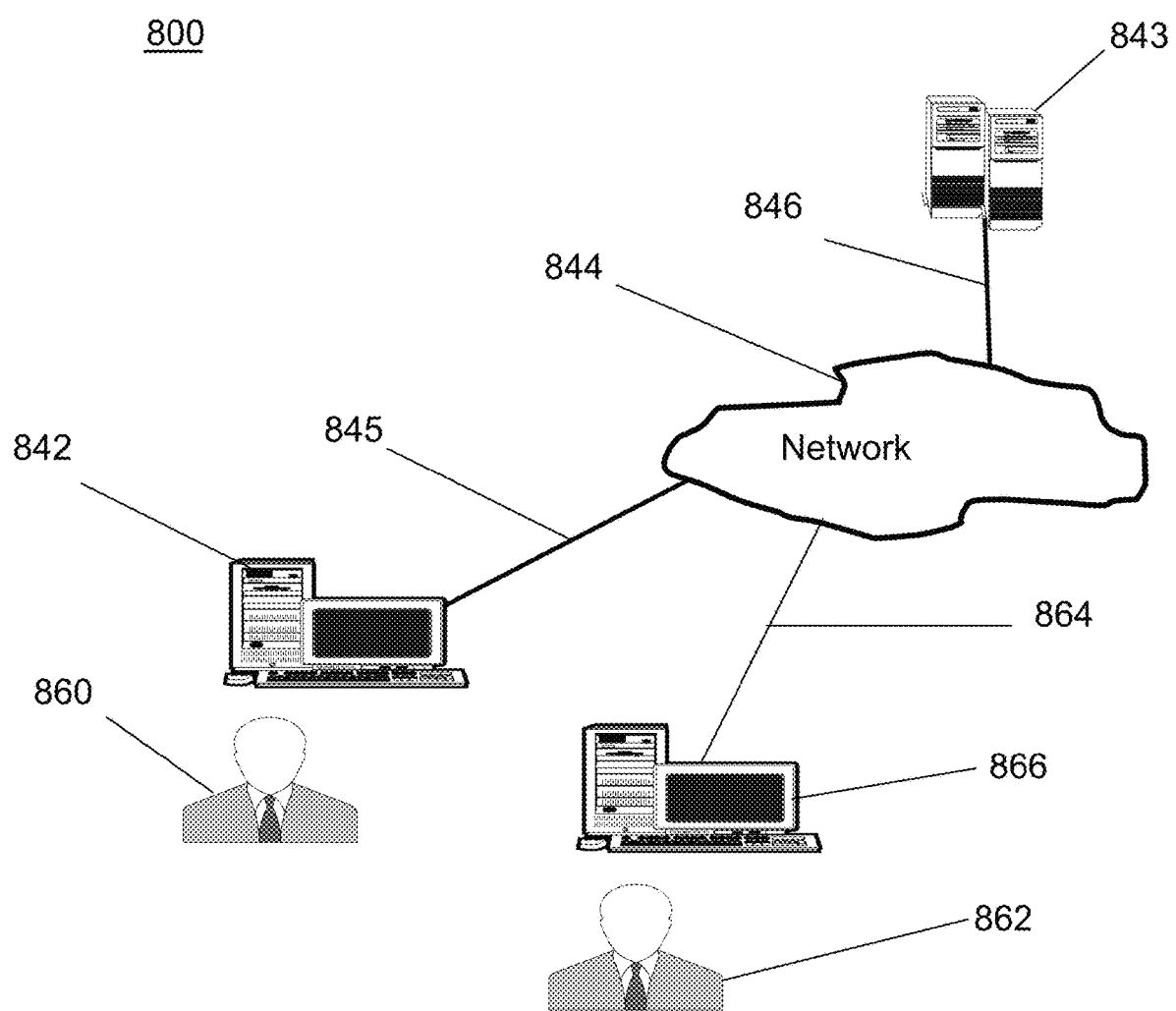
FIG. 8 is a block diagram of various exemplary system components, for use in accordance with aspects of the present disclosure.

FIG. 8 is a block diagram of various example system components that may be used in accordance with aspects of the present disclosure. For example, the various components may be within the vehicle 102, or only some of the components may be within the vehicle 102, and other components may be remote from the vehicle 102. The system 800 includes one or more accessors 860, 862 (also referred to interchangeably herein as one or more "users") and one or more terminals 842, 866 (such terminals may be or include, for example, various features of the vehicle control system 110). In one aspect, data for use in accordance with aspects of the present disclosure is, for example, input and/or accessed by accessors 860, 862 via terminals 842, 866, such as personal computers (PCs), minicomputers, mainframe computers, microcomputers, telephonic devices, or wireless devices, such as personal digital assistants ("PDAs") or a hand-held wireless devices coupled to a server 843, such as a PC, minicomputer, mainframe computer, microcomputer, or other device having a processor and a repository for data and/or connection to a repository for data, via, for example, a network 844, such as the Internet or an intranet, and couplings 845, 846, 864. The couplings 845, 846, 864 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of determining usage of a vehicle, comprising, by a processor of the vehicle:
collecting vehicle trip data via a vehicle sensor system during a monitoring window;
partitioning trips of the vehicle trip data into a base group and a contrast group;
calculating a similarity score between the contrast group and the base group, wherein calculating the similarity score comprises determining a number of new points of interest visited during the trips in the contrast group;
determining that the vehicle has been used for commercial purposes in response to the similarity score satisfying a threshold, wherein determining that the vehicle has been used for commercial purposes in response to the similarity score satisfying the threshold comprises determining that the vehicle has been used for commercial purposes in response to determining that the number of new points of interest visited during the trips in the contrast group is greater than one point of interest per day; and
displaying a message on a display of the vehicle indicating that the vehicle has been used for commercial purposes.

2. The method of claim 1, wherein partitioning the vehicle trip data comprises assigning trips before a target date to the base group and assigning trips after the target date to the contrast group.

3. The method of claim 1, wherein calculating the similarity score comprises determining a similarity between days and times of the trips in the contrast group and the trips in the base group.

4. The method of claim 1, wherein calculating the similarity score comprises determining a difference in distance and duration of the trips in the contrast group and the trips in the base group.

5. The method of claim 1, wherein calculating the similarity score comprises determining a similarity in locations of the trips in the contrast group and the trips in the base group.

6. The method of claim 1, wherein calculating the similarity score comprises combining separate scores based on time similarity, distance and duration similarity, and location similarity.

7. The method of claim 1, wherein determining the number of new points of interest visited comprises:
determining, based on a signal from a door sensor, that a vehicle door was opened at a location determined based on a global positioning system;
determining, based on a seat sensor, that a number of occupied seats changed at the location;
determining that the location is not present in the trips in the base group; and
adding the location as a new point of interest.

8. A method of determining usage of a vehicle, comprising, by a processor of the vehicle:
determining, based on a global positioning system, that the vehicle has visited a point of interest;
comparing the point of interest to previously visited points of interest to determine whether the point of interest is a new point of interest;
determining a rate of visiting new points of interest over a time window;
determining that the vehicle is being used for commercial purposes in response to determining that the rate of visiting new points of interest during the time window exceeds a threshold; and
displaying a message on a display of the vehicle indicating that the vehicle has been used for commercial purposes.

9. The method of claim 8, wherein determining that the vehicle has visited the point of interest comprises:
determining, based on a signal from a door sensor, that a vehicle door was opened at a location determined based on the global positioning system;
determining, based on a seat sensor, that a number of occupied seats changed at the location; and
determining that the location corresponds to the point of interest.

10. The method of claim 8, wherein the threshold is based on a length of time since a purchase of the vehicle.

11. The method of claim 8, wherein the threshold is one new point of interest per day.

12. An apparatus for determining usage of a vehicle, comprising:
a memory; and
at least one processor coupled to the memory and configured to:
collect vehicle trip data via a vehicle sensor system during a monitoring window;
partition trips of the vehicle trip data into a base group and a contrast group;
calculate a similarity score between the contrast group and the base group including a number of new points of interest visited during the trips in the contrast group;
determine that the vehicle has been used for commercial purposes in response to determining that the number of new points of interest visited during the trips in the contrast group is greater than one point of interest per day; and
displaying a message on a display of the vehicle indicating that the vehicle has been used for commercial purposes.

13. The apparatus of claim 12, wherein the at least one processor includes a telematics unit of the vehicle, wherein the at least one processor is configured to transmit an indication that the vehicle has been used for commercial purposes to a manufacturer system.

14. The apparatus of claim 13, further comprising the sensor system that generates the vehicle trip data, the sensor system including one or more of a clock, a global positioning system, an inertial measurement unit, an odometer, a door sensor, or a seat sensor.

15. The apparatus of claim 12, wherein the at least one processor is configured to assign trips before a target date to the base group and assign trips after the target date to the contrast group.

16. The apparatus of claim 12, wherein the at least one processor is configured to:
determine a timing score based on a similarity between days and times of the trips in the contrast group and the trips in the base group;
determine a distance score based on a difference in distance and duration of the trips in the contrast group and the trips in the base group; and determine a location score based on a similarity in locations of the trips in the contrast group and the trips in the base group.

17. The apparatus of claim 16, wherein the at least one processor is configured to combine the timing score, the distance score, and the location score to determine the similarity score.

18. The apparatus of claim 12, wherein the at least one processor is configured to: determine, based on a signal from a door sensor, that a vehicle door was opened at a location determined based on a global positioning system;
   determine, based on a seat sensor, that a number of occupied seats changed at the location;
   determine that the location is not present in the trips in the base group; and
   add the location as a new point of interest.

\* \* \* \* \*